(12) United States Patent
Kowalevicz et al.

(10) Patent No.: US 11,133,873 B1
(45) Date of Patent: Sep. 28, 2021

(54) METHOD FOR A POLARIZATION-STATE INDEPENDENT COMPLEX OPTICAL RECEIVER

(71) Applicant: RAYTHEON COMPANY, Waltham, MA (US)

(72) Inventors: Andrew Kowalevicz, Arlington, VA (US); Benjamin P. Dolgin, Alexandria, VA (US); Gary M. Graceffo, Burke, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 17/082,897

(22) Filed: Oct. 28, 2020

(51) Int. Cl.
*H04B 10/60* (2013.01)
*H04B 10/61* (2013.01)

(52) U.S. Cl.
CPC ....... *H04B 10/6151* (2013.01); *H04B 10/614* (2013.01); *H04B 10/6163* (2013.01); *H04B 10/6166* (2013.01); *H04B 10/60* (2013.01)

(58) Field of Classification Search
CPC .............. H04B 10/6151; H04B 10/614; H04B 10/6163; H04B 10/6166; H04B 10/60
USPC .................................................. 398/202–214
See application file for complete search history.

(56) References Cited

U.S. PATENT DOCUMENTS

| | | | |
|---|---|---|---|
| 6,263,129 B1 * | 7/2001 | Cao | G02B 6/272 385/24 |
| 6,331,910 B1 * | 12/2001 | Dultz | G02F 1/1326 359/246 |
| 6,765,679 B2 * | 7/2004 | Ducellier | G02B 6/2713 356/491 |
| 9,973,281 B2 | 5/2018 | Kowalevicz et al. | |
| 10,177,856 B2 | 1/2019 | Kowalevicz et al. | |
| 10,225,020 B2 | 3/2019 | Dolgin et al. | |
| 10,243,673 B2 | 3/2019 | Dolgin et al. | |
| 10,250,292 B2 | 4/2019 | Graceffo et al. | |
| 10,305,602 B2 | 5/2019 | Dolgin et al. | |
| 10,374,743 B2 | 8/2019 | Dolgin et al. | |
| 10,498,464 B2 | 12/2019 | Graceffo et al. | |
| 10,554,306 B1 | 2/2020 | Graceffo et al. | |
| 10,637,580 B2 | 4/2020 | Dolgin et al. | |
| 10,686,533 B2 | 6/2020 | Dolgin et al. | |

(Continued)

*Primary Examiner* — Dibson J Sanchez
(74) *Attorney, Agent, or Firm* — Lando & Anastasi, LLP

(57) ABSTRACT

An optical receiver includes an inlet aperture configured to receive an incident optical signal and a plurality of optical components configured to separate the incident optical signal into an amplitude modulated transmitted linearly s-polarized signal, an amplitude modulated transmitted linearly p-polarized signal, an amplitude modulated reflected linearly s-polarized signal, and an amplitude modulated reflected linearly p-polarized signal. The optical components further combine the amplitude modulated transmitted linearly s-polarized signal and amplitude modulated transmitted linearly p-polarized signal into an amplitude modulated transmitted linearly polarized combined signal, combine the amplitude modulated reflected linearly s-polarized signal and amplitude modulated reflected linearly p-polarized signal into an amplitude modulated reflected linearly polarized combined signal, and provide the amplitude modulated transmitted linearly polarized combined signal and the amplitude modulated reflected linearly polarized combined signal.

20 Claims, 5 Drawing Sheets

(56) References Cited

U.S. PATENT DOCUMENTS

| | | | |
|---|---|---|---|
| 10,924,189 B2 | 2/2021 | Kowalevicz et al. | |
| 2002/0122614 A1* | 9/2002 | Zhou | G02B 6/29358 385/15 |
| 2005/0157397 A1* | 7/2005 | Efimov | G02B 6/29362 359/629 |
| 2017/0250776 A1* | 8/2017 | Morsy-Osman | H04J 14/06 |
| 2018/0091232 A1* | 3/2018 | Dolgin | H01S 3/08031 |
| 2019/0319714 A1* | 10/2019 | Kowalevicz | H04B 10/11 |
| 2021/0018817 A1 | 1/2021 | Kowalevicz et al. | |
| 2021/0021351 A1 | 1/2021 | Kowalevicz et al. | |
| 2021/0105073 A1 | 4/2021 | Graceffo et al. | |

* cited by examiner

METHOD FOR A POLARIZATION-STATE INDEPENDENT COMPLEX OPTICAL RECEIVER

BACKGROUND

Many optical communication systems manipulate light waves to carry information. For instance, often a light source (e.g., a laser source) is modulated to change various properties of emitted light, such as an amplitude, phase, or frequency of the light to convey information. An optical receiver may receive and demodulate the light waves to recover the information. There are many different types and formats of modulation that can be used, along with a wide range of possible carrier wavelengths. Generally, coherent optical receivers are required to provide the ability to accommodate complex modulation formats and high data rates. For free-space optical communications applications, additional adaptive optics are also sometimes required.

SUMMARY

Aspects and embodiments are directed to optical receivers and methods of using the same.

In accordance with one aspect, there is provided an optical receiver. The optical receiver comprises an inlet aperture configured to receive an incident optical signal having an arbitrary polarization and a plurality of optical components. The plurality of optical components are configured to separate the incident optical signal into an amplitude modulated transmitted linearly s-polarized signal, an amplitude modulated transmitted linearly p-polarized signal, an amplitude modulated reflected linearly s-polarized signal, and an amplitude modulated reflected linearly p-polarized signal, combine the amplitude modulated transmitted linearly s-polarized signal and amplitude modulated transmitted linearly p-polarized signal into an amplitude modulated transmitted linearly polarized combined signal, combine the amplitude modulated reflected linearly s-polarized signal and amplitude modulated reflected linearly p-polarized signal into an amplitude modulated reflected linearly polarized combined signal, and provide the amplitude modulated transmitted linearly polarized combined signal and the amplitude modulated reflected linearly polarized combined signal.

In some embodiments, the plurality of optical components includes a polarizing beam splitter that receives a portion of the incident optical signal and separates the portion of the incident optical signal into a first linear p-polarized signal and a first linear s-polarized signal.

In some embodiments, the plurality of optical components further includes a polarization rotator positioned to receive the first linear s-polarized signal and transform the linear s-polarized signal into a first polarization rotated signal.

In some embodiments, the polarization rotator a Faraday rotator.

In some embodiments, the first linear s-polarized signal is complex modulated and the polarization rotator is a quarter-wave plate configured to convert the first complex modulated linear s-polarized signal into a complex modulated circularly polarized signal as the first polarization rotated signal.

In some embodiments, the plurality of optical components further includes a first optical resonator positioned to receive the first polarization rotated signal from the polarization rotator that converts a first portion of the first polarization rotated signal to a first amplitude modulated polarized signal, that reflects a first portion of the first amplitude modulated polarized signal back to the polarization rotator, that receives a second portion of the first polarization rotated signal from the polarization rotator and converts the second portion of the first polarization rotated signal into a first amplitude modulated signal, and that transmits the first amplitude modulated polarized signal.

In some embodiments, the first optical resonator is an etalon.

In some embodiments, the polarization rotator receives the first portion of the first amplitude modulated polarized signal reflected from the first optical resonator and is configured to transform the first amplitude modulated polarized signal reflected from the first optical resonator into the amplitude modulated reflected linear p-polarized signal and to direct the amplitude modulated reflected linear p-polarized signal back toward the polarizing beam splitter.

In some embodiments, the plurality of optical components further includes a second polarization rotator positioned to receive the first linear p-polarized signal and transform the linear p-polarized signal into a second polarization rotated signal.

In some embodiments, the polarization rotator is a Faraday rotator.

In some embodiments, the first modulated linear p-polarized signal is complex modulated and the polarization rotator is a quarter-wave plate configured to convert the first complex modulated linear p-polarized signal into a complex modulated circularly polarized signal as the second polarization rotated signal.

In some embodiments, the plurality of optical components further includes a second optical resonator positioned to receive the second polarization rotated signal from the second polarization rotator, that converts a first portion of the second polarization rotated signal to a second amplitude modulated polarized signal, that reflects a first portion of the second amplitude modulated polarized signal back to the second polarization rotator, that receives a second portion of the second polarization rotated signal from the second polarization rotator and converts the second portion of the second polarization rotated signal into a second amplitude modulate polarized signal, and that transmits the second amplitude modulated polarized signal.

In some embodiments, the optical resonator is an etalon.

In some embodiments, the second polarization rotator is positioned to receive the first portion of the second amplitude modulated polarized signal reflected from the second optical resonator and configured to transform the second amplitude modulated polarized signal reflected from the second optical resonator into the amplitude modulated reflected linear s-polarized signal and to direct the amplitude modulated reflected linear s-polarized signal back toward the polarizing beam splitter.

In some embodiments, the polarizing beam splitter is configured to combine the amplitude modulated reflected linearly s-polarized signal and amplitude modulated reflected linearly p-polarized signal into the amplitude modulated reflected linearly polarized combined signal and to direct the amplitude modulated reflected linearly polarized combined signal to a first optical output of the optical receiver.

In some embodiments, the amplitude modulated reflected linearly polarized combined signal is focused into a multi-mode fiber so that the signal can be processed remotely from the optical receiver.

In some embodiments, the optical components for the reflected amplitude modulated linearly s-polarized signal and amplitude modulated reflected linearly p-polarized signal are pathlength matched.

In some embodiments, the optical receiver further comprises a third polarization rotator positioned to receive the second amplitude modulated polarized signal transmitted from the second optical resonator and configured to transform the second amplitude modulated polarized signal transmitted from the second optical resonator into the amplitude modulated transmitted linearly s-polarized signal.

In some embodiments, the optical receiver further comprises a fourth polarization rotator positioned to receive the first amplitude modulated polarized signal transmitted from the first optical resonator and configured to transform the first amplitude modulated polarized signal transmitted from the first optical resonator to the amplitude modulated transmitted linearly p-polarized signal.

In some embodiments, the optical receiver further comprises a second beam splitter positioned to receive the amplitude modulated transmitted linearly s-polarized signal and the amplitude modulated transmitted linearly p-polarized signal and configured to combine the amplitude modulated transmitted linearly s-polarized signal and amplitude modulated transmitted linearly p-polarized signal into the amplitude modulated transmitted linearly polarized combined signal and to provide the amplitude modulated transmitted linearly polarized combined signal to a second optical output of the optical receiver.

In some embodiments, the amplitude modulated transmitted linearly polarized combined signal is focused into a multimode mode fiber so that the signal can be processed remotely from the optical receiver.

In some embodiments, the optical components that provide the amplitude modulated transmitted linearly s-polarized signal and the amplitude modulated transmitted linearly p-polarized signal are pathlength matched.

In some embodiments, all of the optical components that provide the amplitude modulated transmitted linearly polarized combined signal and the amplitude modulated reflected linearly polarized combined signal are phase matched.

In accordance with another aspect, there is provided a method of processing an incident optical signal having an arbitrary polarization. The method comprises separating the incident complex modulated optical signal into an amplitude modulated transmitted linearly s-polarized signal, an amplitude modulated transmitted linearly p-polarized signal, an amplitude modulated reflected linearly s-polarized signal, and an amplitude modulated reflected linearly p-polarized signal, combining the amplitude modulated transmitted linearly s-polarized signal and amplitude modulated transmitted linearly p-polarized signal into an amplitude modulated transmitted linearly polarized combined signal, combining the amplitude modulated reflected linearly s-polarized signal and amplitude modulated reflected linearly p-polarized signal into an amplitude modulated reflected linearly polarized combined signal, and outputting the amplitude modulated transmitted linearly polarized combined signal and the amplitude modulated reflected linearly polarized combined signal.

In some embodiments, the method comprises directing the amplitude modulated transmitted linearly polarized combined signal into a first optical fiber and directing the amplitude modulated reflected linearly polarized combined signal into a second optical fiber.

In some embodiments, separating the incident complex modulated optical signal includes directing a portion of the incident complex modulated optical signal through a polarizing beam splitter that separates the portion of the incident optical signal into a first linear p-polarized signal and a first linear s-polarized signal, directing the first linear s-polarized signal through a polarization rotator that transforms the linear s-polarized signal into a first polarization rotated signal, and directing the first linear p-polarized signal through a second polarization rotator that transforms the linear p-polarized signal into a second polarization rotated signal.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments and are incorporated in and constitute a part of this specification but are not intended as a definition of the limits of the disclosure. For purposes of clarity, not every component may be labeled or shown in every figure. In the figures.

DETAILED DESCRIPTION

Figure 1:
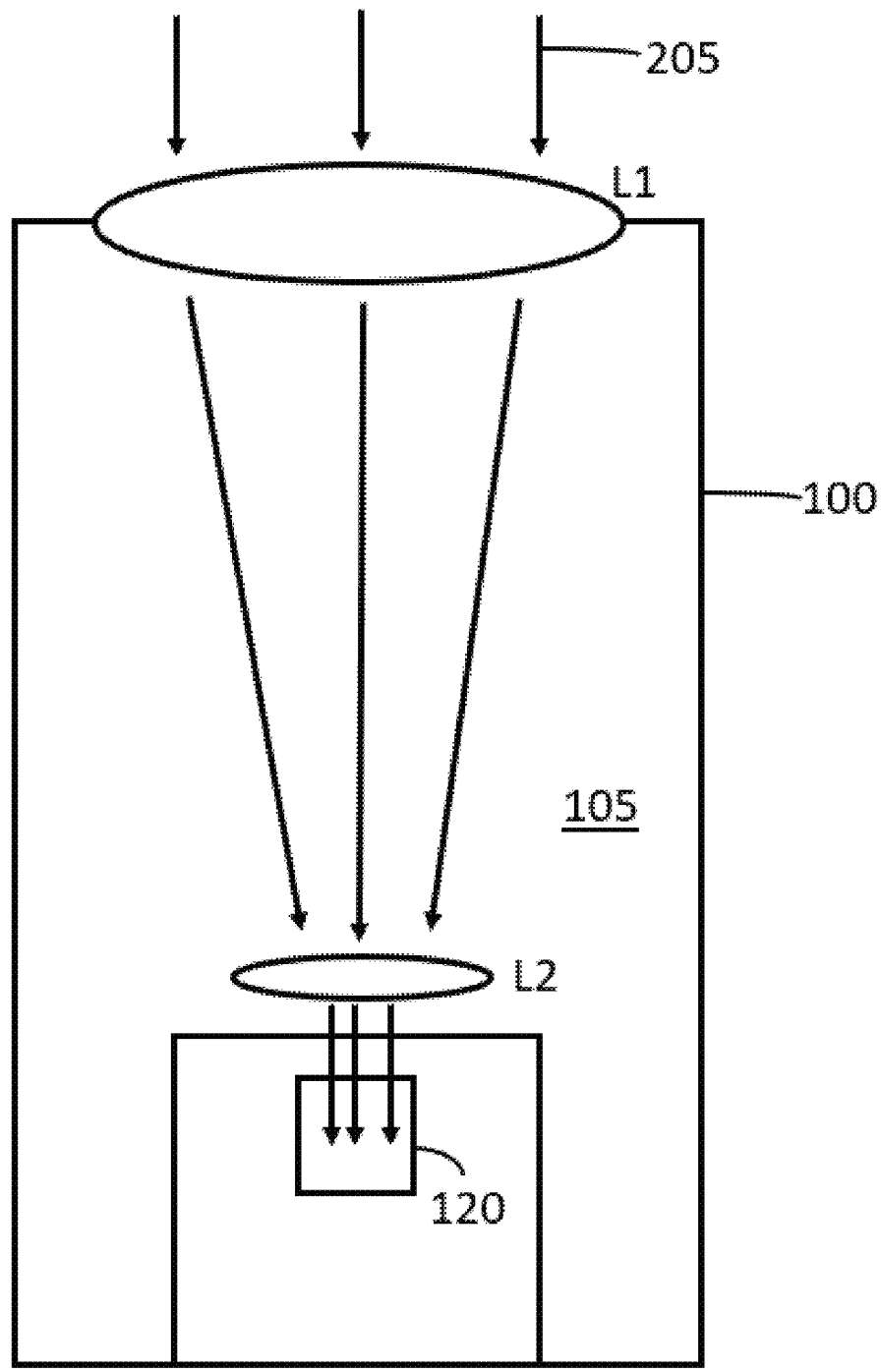
FIG. 1 illustrates an upper portion of an example of an optical receiver.

For certain optical receivers it is desirable to be able to read information encoded in light signals having an unknown and/or changing incoming polarization state without active measures. In previously known coherent receivers, active measures can be taken to align linearly polarized light to the appropriate angle. Also, in self-coherent systems, polarization control is automatically aligned by a self-referencing technique. In both types of systems, coupling to single-mode-fiber is required, which adds cost, complexity and loss to the system. Aspects and embodiments disclosed herein include a method and architecture to combine transmitted and reflected signals from an etalon-enhanced receiver such that the signal measured will be completely independent of polarization state (linear, elliptical, circular). In various aspects disclosed herein, conversion of complex modulation to intensity modulation is performed on orthogonal polarizations of a received light beam and the intensity modulated beams are then recombined for direct detection. This has the advantage of low-loss, high-sensitivity, single- or double-ended detection without the need for single mode fiber or the additional system requirements associated with it. Aspects and embodiments of the method and system disclosed herein provide for passive demodulation for changing polarization states without hardware or software adjustments. Embodiments of an optical receiver disclosed herein can be utilized for optical signals having information encoded via either intensity modulation or complex modulation. The receiver may enable single ended or double-ended detection of linear and circularly-polarized light without hardware or software adjustments and can perform demodulation on a complex signal coming from a multimode fiber without hardware or software adjustments.

Aspects and embodiments of the method and system disclosed herein provide any of the following advantages over previously known coherent receivers or self-coherent systems including that no wavefront correction is needed, no adaptive optics are needed, no coupling to single mode fiber is needed, no local oscillator is needed, no wavefront sensor sensors are needed, no deformable mirrors are needed, and no feedback are needed. Additional advantages are that polarization state can change without the need for hardware or software adjustments, both circularly polarized and linear polarized light can be received and detected without the need for hardware or software adjustments, single-ended or double-ended detection of such signals can be accomplished without the need for hardware or software adjustments, passive demodulation and demodulation of complex signals can be accomplished without the need for hardware or software adjustments. Additional advantages are that the orientation of the platform that houses the receiver can move and the receiver and systems disclosed herein may receive the signals and operate without the need for the polarization state of the incoming light signals to be known, without the need for the polarization state of the incoming light signals to be detected and processed, without the need for the polarization state of the incoming light signals to be linearly polarized. Still additional advantages include that the receiver is versatile, low-cost, compact, simple and robust.

It is to be appreciated that embodiments of the method and optical receiver discussed herein are not limited in application to the details of construction and the arrangement of components set forth in the following description or illustrated in the accompanying drawings. The method and optical receiver are capable of implementation in other embodiments and of being practiced or of being carried out in various ways. Examples of specific implementations are provided herein for illustrative purposes only and are not intended to be limiting.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation. The terms light, light signal, and optical signal may be used interchangeably herein and refer generally to an electromagnetic signal that propagates through a given medium, which may be empty space, e.g., a vacuum, or may be an atmospheric, e.g., air, or other medium, such as fiber or other optics components. The terms "light," "light signal," and "optical signal" are not meant to imply any particular characteristic of the light, such as frequency or wavelength, band, coherency, spectral density, quality factor, etc., and may include radio waves, microwaves, infrared, visible, and/or ultraviolet electromagnetic radiation, or other non-ionizing electromagnetic radiation conventionally processed in the field of optics.

FIGS. 1-4 illustrate one example of an optical receiver according to various examples described herein. FIGS. 1-4 illustrate the optical receiver broken into three modules, which, in some embodiments, may be stacked into upper, middle, and lower levels to provide for a compact device. The overall receiver may have dimensions of, for example, about six inches in length, five inches in width, and five inches in height, which is considerably more compact (about 10 time less volume and weight in some instances) than known receivers for providing similar functionality but include adaptive optics. It should be appreciated that in other embodiments, the three different modules may be combined in a single level or module, that any number of layers can be used, and that any layout configuration that implements the concepts disclosed herein can be used.

The optical receiver may include various optical elements (e.g., shown as lenses L1-L5 and reflective surfaces R1-R4) for directing and/or focusing light on or towards one or more other optical elements of the optical receiver. While lenses L1-L5 are shown as being a single lens for illustrative purposes, in various examples, each lens may be a plurality of lenses and/or other optical elements. The reflective surfaces R1-R4 are each illustrated as shaped folding mirrors, but may alternatively may each include one or more prisms, plane mirrors, or other forms of optical reflectors. As will be discussed herein, the optical receiver further includes demodulators that include optical resonators 310. As used herein, the term "optical resonator" refers to a component capable of sensing variations, such as frequency variations, amplitude variations, or phase variations in the received optical signal and that convert complex modulated optical signals into intensity modulated signals. Examples of optical resonators may include Fabry-Perot etalons or other types of optical resonators.

The upper level 105 of the optical receiver is illustrated in FIG. 1. The optical receiver includes an aperture L1 (e.g., an objective lens) to receive an incident optical signal 205. The incident optical signal 205 may be transmitted along a free space signal path (e.g., free space optical, hereinafter "FSO"), a multi-mode optical fiber coupling, or another optical waveguide system from a transmitter (not shown). The incident optical signal 205 may be, for example, a complex modulated laser signal in which an underlying signal, such as a radio frequency signal, may be modulated via amplitude, phase, or frequency modulation, or any combination thereof. The incident optical signal 205 may alternatively not be complex modulated, but, for example, may be amplitude modulated. The incident optical signal may have an arbitrary or unknown polarization or combination of linear, elliptical, and/or circular polarizations. The aperture L1 is positioned to receive a free-space optical signal and direct the free-space optical signal to a second lens L2 within a housing 100 of the optical detector that collimates the optical signal 205. While shown as including a single lens, in various examples, a plurality of mirrors or lenses may be positioned at the aperture L1 to collect, direct, and/or focus the free-space optical signal toward the second lens L2. For instance, an objective lens or objective lens assembly may form the aperture L1. The aperture L1 and the second lens L2 may be centered about an optical axis along which the incident optical signal 205 travels. The incident optical signal may primarily consist of non-ionizing electromagnetic radiation.

Figure 2:
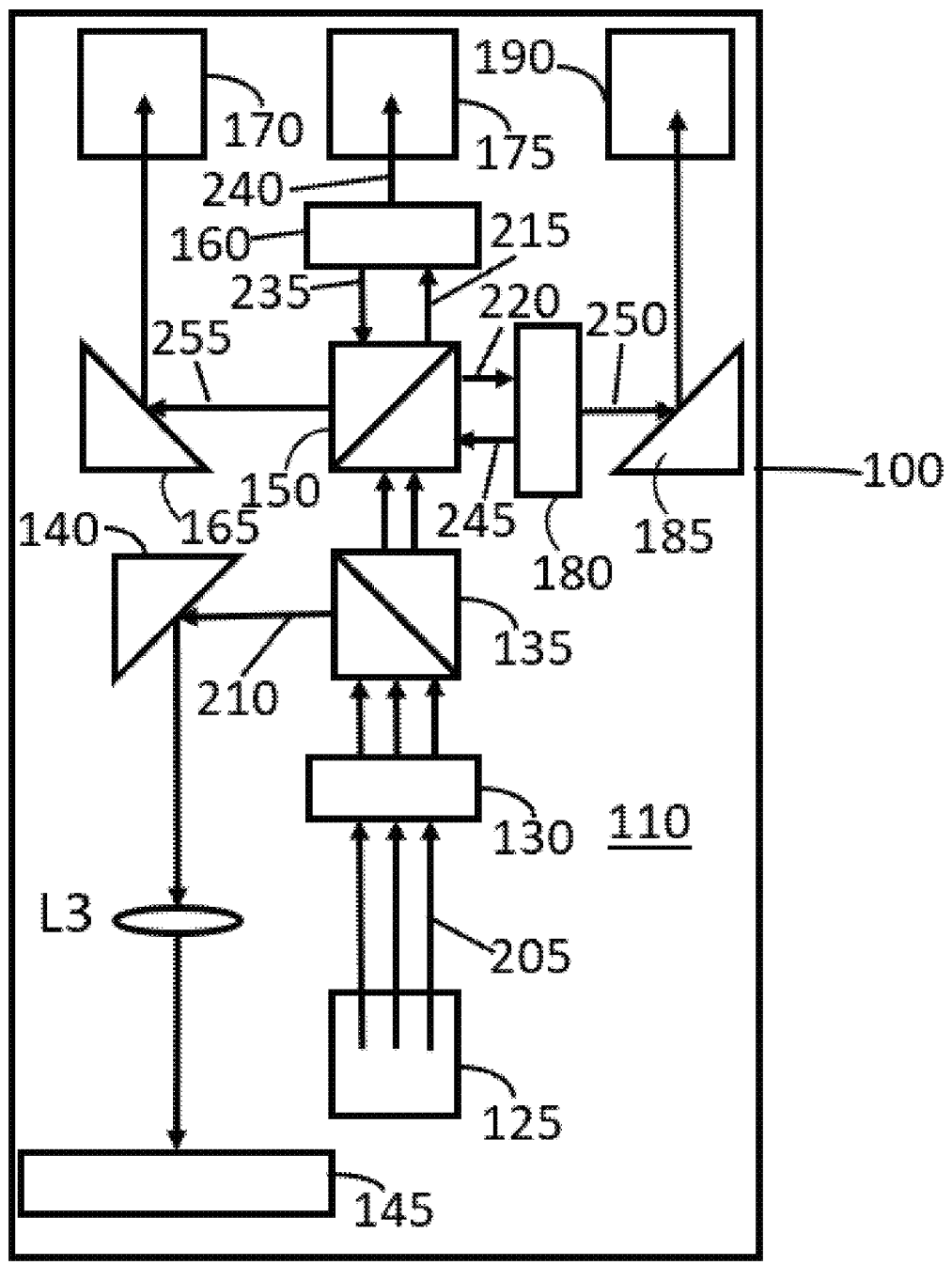
FIG. 2 illustrates a middle portion of an example of an optical receiver.

The second lens L2 directs the collimated optical signal into a steering mechanism 120 that, in turn, reflects the collimated optical signal downward into the middle level 110 of the optical receiver. As illustrated in FIG. 2, the optical signal is directed by the steering mechanism 120 onto an optical reflector 125, for example, a mirror. The optical reflector 125 directs the optical signal through an optical band pass filter 130 which removes undesired frequencies of light from the optical signal. The band passed optical signal proceeds from the optical band pass filter 130 into a beam splitter 135 that directs a portion 210 of the optical signal out of the main optical path of the optical signal 205 and to another optical reflector 140, illustrated as a shaped folding mirror, but which may alternatively include a plane mirror. The optical reflector 140 directs the portion 210 of the optical signal through a third lens L3 that focusses the portion 210 of the optical signal onto an optical detector 145. According to some embodiments, the detector 145 is coupled to one or more of a controller and a steering mechanism. In some embodiments the detector 145 is a position detector. In some embodiments, the steering mechanism 120 is a Fast Steering Mirror 120. In some embodiments, the detector 145 is a quad cell. In other embodiments, the detector 145 is an octo cell. The detector 145 determines a position of the focused portion 210 of the optical signal and provides feedback to a controller or directly to the Fast Steering Mirror 120 to adjust the amount of deflection of the optical signal 205 so that the portion 210 of the optical signal is centered on the detector 145 and the optical signal 205 is properly aligned with the components of the optical receiver.

It is appreciated that the beam splitter 135 can have any ratio of beam splitting of the signals that make up the portion 210 of the optical signal and the remainder of the optical signal 205 that passes straight through the beam splitter 135, such that the first number in the ratio added to the second number in the ratio equals 100. In some embodiments, the beam splitter is an 80/20 beam splitter. In other embodiments, the first beam splitter is a 95/5 beam splitter. In some embodiments, the first beam splitter is a 50/50 beam splitter. In some embodiments, the beam splitter 130 is a plate beam splitter or cube beam splitter.

The portion of the optical signal 205 that passes through the beam splitter 135 travels to a polarizing beam splitter 150. The polarizing beam splitter 150 may be a plate beam splitter or cube beam splitter. The polarizing beam splitter 150 separates the optical signal 205 into two polarized optical signals 215, 220 with different polarizations. The optical signal 215 is a linear p-polarized signal and the optical signal 220 is a linear s-polarized signal. The optical signal 215 travels to an optical component 160 that includes a quarter-wave plate or polarization rotator such as a Faraday rotator disposed in front of an optical resonator. This component is described in more detail with reference to FIG. 3 below.

Figure 3:
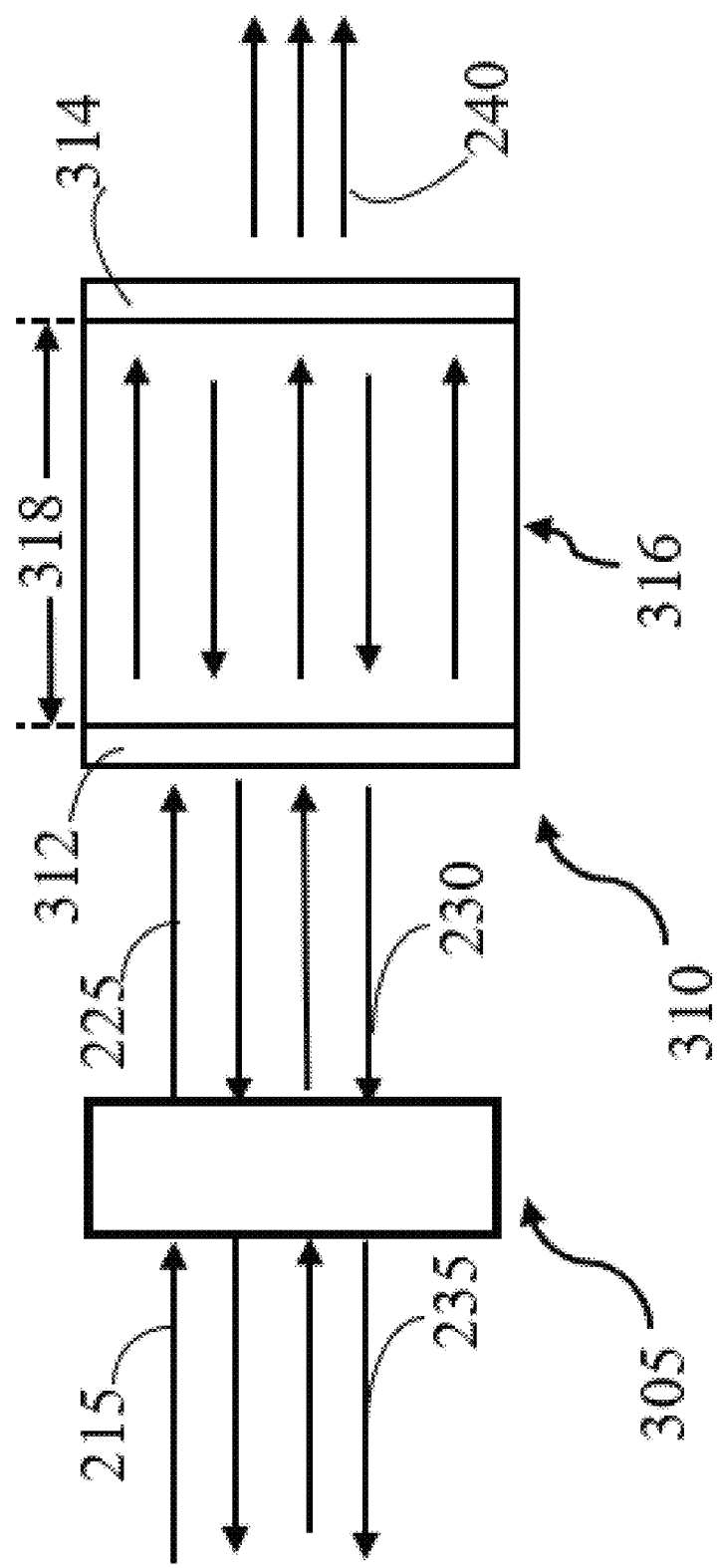
FIG. 3 illustrates an example of an optical component included in the middle portion of the example of the optical receiver.
Figure 4:
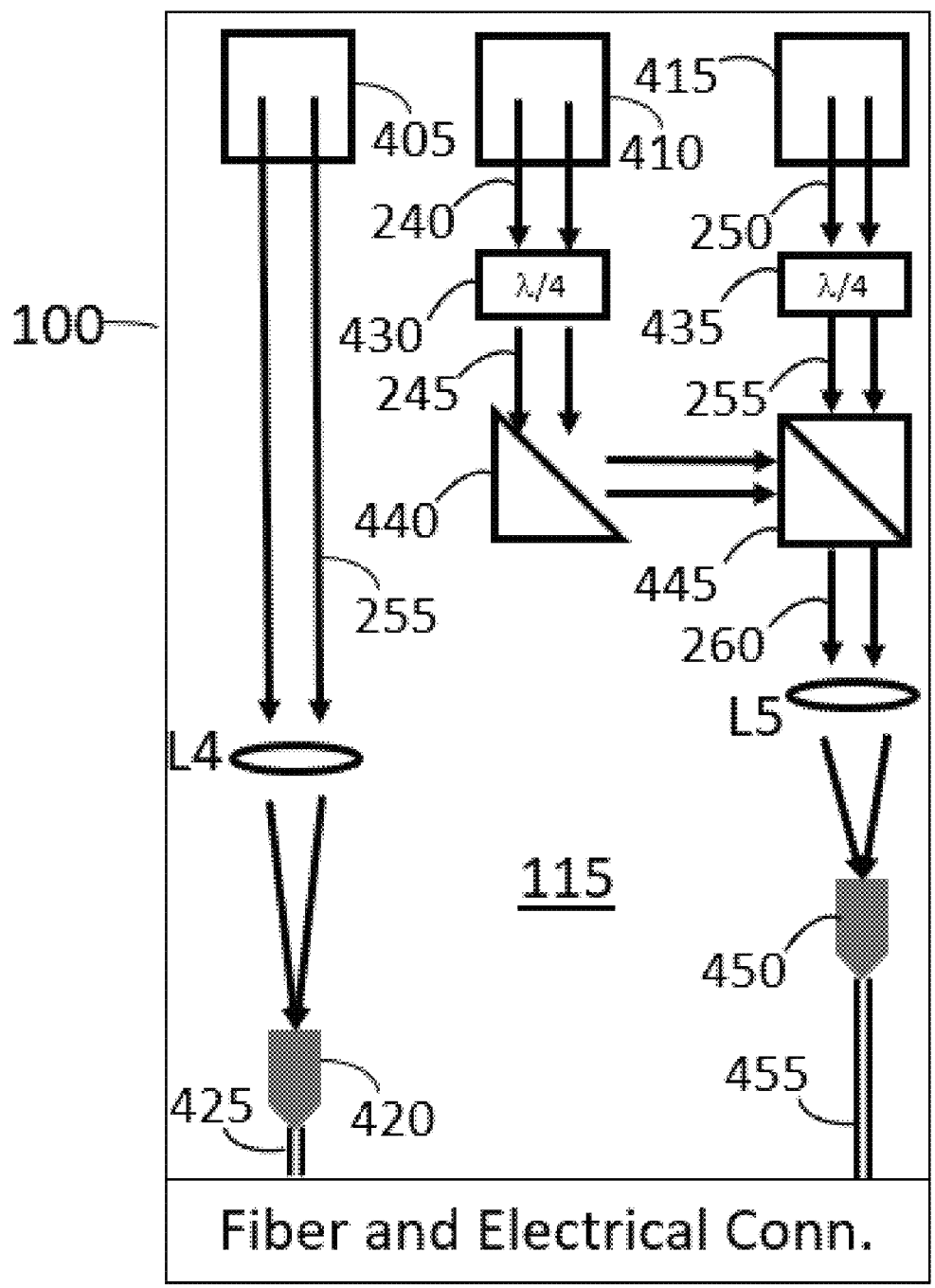
FIG. 4 illustrates a lower portion of an example of an optical receiver.

As illustrated in FIG. 3, optical component 160 includes a polarization rotator 305 such as a quarter-wave plate or Faraday rotator disposed optically in front of an optical resonator 310. In embodiments in which the polarization rotator 305 is a quarter-wave plate the optical signal 215 passes through the quarter-wave plate it is transformed into a circularly polarized signal 225. Alternatively, if a Faraday rotator is utilized as the polarization rotator 305, the optical signal 215 is linearly rotated by 45 degrees after passing through the Faraday rotator rather than being transformed into a circularly polarized signal.

The optical resonator 310 is positioned to receive the signal 225 at a first surface 312. The optical resonator 310 is configured to transform variations in the optical signal 225 into an intensity modulation of transmitted output optical signal energy (also described herein as signal 240). In particular, the optical resonator 310 is configured to accumulate resonant optical signal energy within the optical resonator 310 and convert the variation (e.g., complex modulation including one or more of phase, frequency, or amplitude modulation) of the received optical signal 225 to an intensity modulation of the signal 225, in part, by interaction of the optical signal 225 with resonating optical signal energy within the optical resonator 310.

In certain examples, optical resonator 310 is a component having a pair of parallel semi-reflective surfaces 312 and 314 that may include an optically transparent material in between, and has a characteristic resonant frequency associated with a certain wavelength of light based upon a spacing (i.e., dimension 318) between the semi-reflective surfaces. The surfaces 312 and 314 are semi-reflective and also semi-transmissive, in that they allow some light through, and therefore a first portion of the received optical signal 225 will be reflected by the optical resonator 310 as reflected optical signal 230 and a second portion of the received optical signal provided to the optical resonator 310 may resonate or accumulate inside optical resonator (i.e., in the interior 316 between the two semi-reflective surfaces 312 and 314). Additionally, some of the light resonating inside is provided at an output of the optical resonator 310 (through at least one of the semi-transmissive surfaces 314) as a transmitted signal. Light emerging from the optical resonator 310 is shown, for example, as the transmitted optical signal 240.

The optical resonator 310 is configured to convert the complex modulation of the second portion of the optical signal 225 into an intensity modulated output optical signal 240. The second portion of the optical signal 225 may be phase modulated, amplitude modulated, and/or frequency modulated. It is to be understood that the optical receiver disclosed herein may also be utilized for receiving intensity modulated rather than complex modulated optical signals. In such implementations the second portion of the optical signal 225 would be amplitude modulated rather than complex modulated.

When a steady-state resonance condition is established within the optical resonator 310, the transmitted output optical signal energy (represented by arrow(s) 240) is emitted from the optical resonator 310 at a steady intensity. When a variation occurs in the arriving optical signal 225, temporarily disrupting the steady state, the intensity of the transmitted output optical signal energy is disrupted. During successive reflections of the free-space optical signal inside the optical resonator 310, steady-state is re-established, and the intensity of the transmitted output optical signal energy returns to its steady-state level.

The optical resonator 310 may be an etalon which may have one or more characteristic resonant frequencies, each associated with a certain wavelength of light, based upon the spacing (i.e., dimensional length) between the semi-reflective surfaces 312 and 314. In some examples, the etalon may include reflective surfaces (including semi-reflective surfaces) that are not co-planar and/or are not co-linear. For example, an interior reflective surface of the etalon may include some curvature, and an opposing surface may also be curved such that a distance between the two surfaces is substantially constant across various regions of the optical resonator, in some examples. In other examples, the etalon may have non-linear or non-planar surfaces with varying distances between the surfaces at various regions and may still function as an optical resonator for various wavelengths and at various regions, suitable for use in examples discussed herein. Accordingly, the optical resonator 310 of various examples may be purposefully designed to conform to a surface, or to have various regions responsive to differing wavelengths, or responsive to differing angles of arrival for a given wavelength, in certain examples.

The use of the term "etalon" throughout this disclosure is not intended to be limiting and as used herein may include any of multiple structures, including plates with reflecting surfaces as well as parallel mirrors with various materials positioned in-between, and in particular examples, with controllable optical materials positioned in-between. The spacing between the semi-reflective surfaces of an etalon may be referred to herein as a cavity but is not so limited. That is the resonant cavities may include other structures, such interferometers and the like. Additionally, etalon structures may be formed as a laminate, layer, film, coating, or the like.

The first portion of the signal 225 that is reflected from the optical resonator 310 as reflected signal 230 passes back through the polarization rotator 305. In embodiments in which the polarization rotator is a quarter-wave plate, the reflected signal 230 passes back through the quarter-wave plate and is transformed into a reflected linear s-polarized signal 235. Alternatively, if a Faraday rotator is utilized as the polarization rotator 305, the reflected signal 230 is linearly rotated by 45 degrees after passing through the Faraday rotator to form the reflected linear s-polarized signal 235. Referring back to FIG. 2, the reflected linear s-polarized signal 235 passes back to the polarizing beam splitter 150 that reflects the reflected linear s-polarized signal 235 to an optical reflector 165, that is illustrated as a shaped mirror, but that may alternatively include a plane mirror. Optical reflector 165 directs the reflected linear s-polarized signal 235 to optical reflector 170, that may include a plane mirror or shaped mirror and that directs the reflected linear s-polarized signal 235 out of the middle level 110 of the optical detector and into the lower level 115.

The second portion of the signal 225 that was transformed to the transmitted polarized signal 240 in optical component 160 travels to optical reflector 175, that may include a mirror or prism and that directs the transmitted polarized signal 240 out of the middle level 110 of the optical detector and to the lower level 115. In embodiments in which the polarization rotator 305 is a quarter-wave plate the transmitted polarized signal 240 would be circularly polarized. In embodiments in which the polarization rotator 305 is a Faraday rotator the transmitted polarized signal 240 would be linearly polarized.

The linear s-polarized signal 220 exiting the polarizing beam splitter 150 travels to an optical component 180. Optical component 180 includes a polarization rotator or such as a quarter-wave plate or Faraday rotator disposed optically in front of an etalon and may be similar or identical to optical component 160. Optical component 180 transforms a first portion of the linear s-polarized signal 220 into a transmitted polarized signal 250 and a second portion of the linear s-polarized signal 220 into a reflected linear p-polarized signal 245. The transmitted polarized signal 250 is circularly polarized if a quarter wave plate is used as the polarization rotator in optical component 180 and is linearly polarized if a Faraday rotator is used as the polarization rotator in optical component 180

The transmitted polarized signal 250 travels to an optical reflector 185 that is illustrated as a shaped mirror, but that may alternatively include a plane mirror. Optical reflector 185 directs the transmitted polarized signal 250 to optical reflector 190, that may include a plane mirror or shaped mirror and that directs the transmitted polarized signal 250 out of the middle level 110 of the optical detector and into the lower level 115.

The reflected linear p-polarized signal 245 travels back through the polarizing beam splitter 150 and combines with the reflected linear s-polarized signal 235 as reflected linearly polarized combined signal 255, that, as described above with reference to reflected linear s-polarized signal 235 is directed by optical reflector 165 to optical reflector 170 and out of the middle level 110 of the optical detector and into the lower level 115. The total pathlength for the reflected linear p-polarized signal 245 and the reflected linear s-polarized signal 235 are pathlength matched. The total path lengths of the reflected linear p-polarized signal 245 and the reflected linear s-polarized signal 235 from the aperture L1 to the optical reflector 170 are the same. In other embodiments, the total pathlength for the reflected linear p-polarized signal 245 and the reflected linear s-polarized signal 235 are not pathlength matched The lower level 115 of the optical detector is illustrated in FIG. 3. The reflected linearly polarized combined signal 255 is reflected from the optical reflector 170 and in the middle level 110 of the optical detector to optical reflector 405 in the lower level 115 of the optical receiver. The optical reflector 405 directs the reflected linearly polarized combined signal 255 through a fourth lens L4 that focusses the reflected linearly polarized combined signal 255 onto an optical coupler 420 and into an optical fiber 425 that carries the combined linearly polarized signal 255 out of the housing 100 of the optical detector to an external optical detector that may include at least one optical-electrical converter (OEC) and signal processing circuitry to produce a decoded information signal that may include information that was encoded on the incident optical signal 205. The optical fiber 425 is a multimode optical fiber, but in other embodiments, may be a single mode fiber. The reflected linearly polarized combined signal 255 is amplitude modulated.

The transmitted polarized signal 240 is reflected from the optical reflector 175 in the middle level 110 of the optical receiver to optical reflector 410 in the lower level 115 of the optical receiver. The optical reflector 410 directs the transmitted polarized signal 240 through a polarization rotator 430. If the transmitted polarized signal 240 is circularly polarized and the polarization rotator 430 is a quarter-wave plate, the polarization rotator 430 transforms the transmitted circularly-polarized signal 240 to a transmitted linearly s-polarized signal 245. In embodiments in which the transmitted polarized signal 240 is linearly polarized, polarization rotator 430 may alternatively be a Faraday rotator.

The transmitted polarized signal 250 is reflected from the optical reflector 190 in the middle level 110 of the optical receiver to optical reflector 415 in the lower level 115 of the optical receiver. The optical reflector 415 directs the transmitted circularly polarized signal 250 through polarization rotator 435. If the transmitted polarized signal 250 is circularly polarized and the polarization rotator 435 is a quarter-wave plate, the polarization rotator 435 transforms the transmitted circularly-polarized signal 250 to a transmitted linearly p-polarized signal 255. In embodiments in which the transmitted polarized signal 250 is linearly polarized, polarization rotator 435 may alternatively be a Faraday The transmitted linearly s-polarized signal 245 is reflected by optical reflector 440, illustrated as a shaped mirror, but alternatively being a plane mirror, into beam splitter/combiner 445. The transmitted linearly p-polarized signal 255 also travels into the beam splitter/combiner 445. The transmitted linearly s-polarized signal 245 and transmitted linearly p-polarized signal 255 are pathlength matched at the beam splitter/combiner 445 in that the total path length of each of these signals from the aperture L1 to the beam splitter/combiner 445 is the same. In other embodiments, the linearly s-polarized signal 245 and transmitted linearly p-polarized signal 255 are not pathlength matched. In the beam splitter/combiner 445 the transmitted linearly s-polarized signal 245 and transmitted linearly p-polarized signal 255 are combined and output as transmitted linearly polarized combined signal 260. The transmitted linearly polarized combined signal 260 is focused by a fifth lens L5 onto an optical coupler 450 and into an optical fiber 455 that carries the transmitted linearly polarized combined signal 260 out of the housing 100 of the optical detector to an external optical detector that may include at least one optical-electrical converter (OEC) and signal processing circuitry to produce a decoded information signal that may include information that was encoded on the incident optical signal 205. The transmitted linearly polarized combined signal 260 is amplitude modulated, even if information was encoded in the incident optical signal 205 with a complex modulation.

Figure 5:
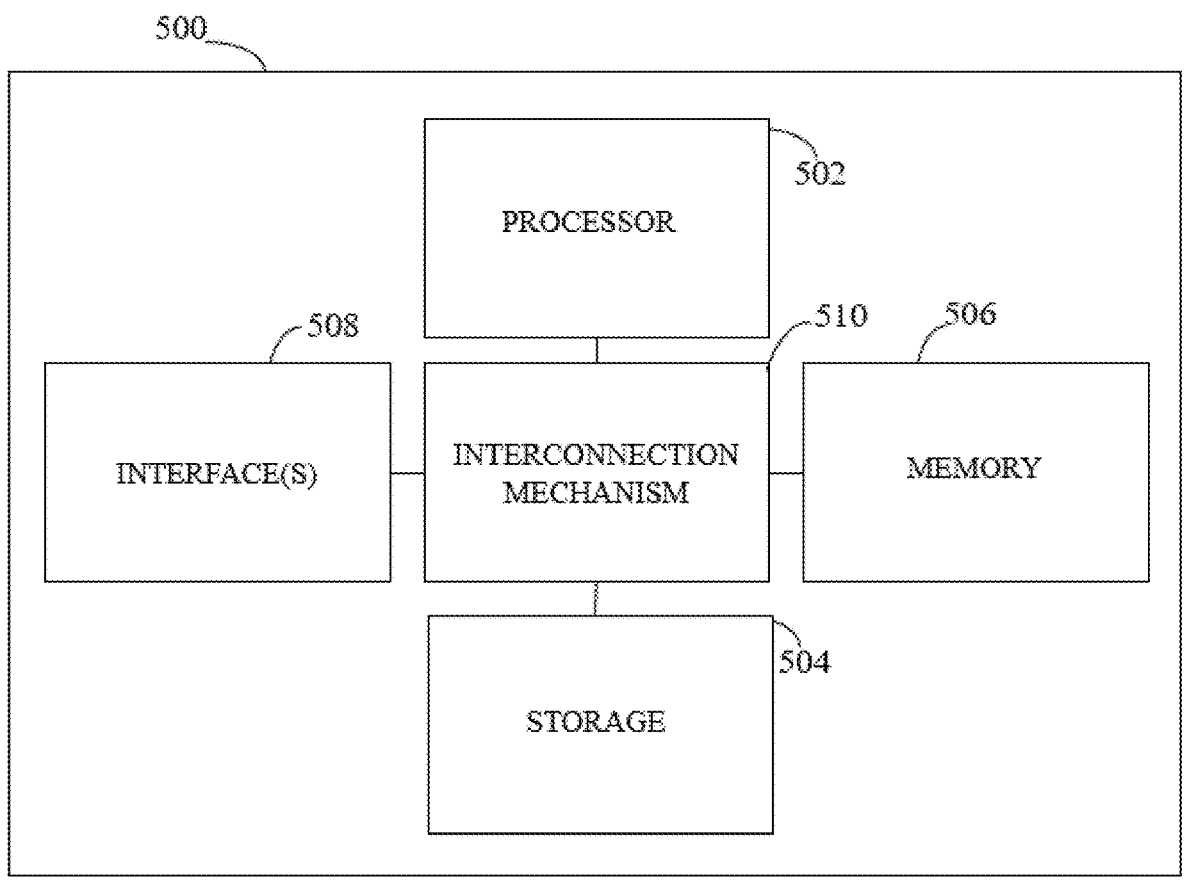
FIG. 5 is a functional block diagram of one example of a processing system that may be used in an optical receiver according to aspects of the present invention.

FIG. 5 illustrates one example of a processing system 500 that may be included within the optical receiver disclosed herein. The processing system 500 may include a processor 502, data storage 504, a memory 506, and one or more interfaces 508, such as a system interface and/or a user interface. While not explicitly illustrated in FIG. 5, in certain examples the processing system 500 may be coupled to a power source. The power source may deliver power to one or more components of the processing system 500, as well as other components of the optical receiver.

In FIG. 5, the processor 502 is coupled to the data storage 504, memory 506, and the various interfaces 508. The memory 506 stores programs (e.g., sequences of instructions coded to be executable by the processor 502) and data during operation of the processing system 500. Thus, the memory 506 may be a relatively high performance, volatile, random access memory such as a dynamic random access memory ("DRAM") or static memory ("SRAM"). However, the memory 506 may include any device for storing data, such as a disk drive or other nonvolatile storage device. Various examples may organize the memory 506 into particularized and, in some cases, unique structures to perform the functions disclosed herein. These data structures may be sized and organized to store values for particular data and types of data.

The data storage 504 includes a computer readable and writeable data storage medium configured to store non-transitory instructions and other data, and can include non-volatile storage medium, such as optical or magnetic disk, ROM or flash memory. The instructions may include executable programs or other code that can be executed by the at least one processor 502 to perform any of the functions described herein.

In various examples, the processing system 500 includes several interface components 508, such as a system interface and/or a user interface. Each of the interface components 508 is configured to exchange, e.g., send or receive, data with other components of the processing system 500 (and/or associated optical receiver), or other devices in communication with the processing system 500. According to various examples, the interface components 508 may include hardware components, software components, or a combination of hardware and software components. In certain examples, components of the system interface couple the processor 502 to one or more components of the optical receiver. The system interface may provide one or more control signals to any such components and may manage the operation of such components, as described above. In some examples, processor 502 corresponds to a controller of the optical receiver.

A user interface may include hardware and/or software components that allow the optical receiver to communicate with an external entity, such as a user. These components may be configured to receive information from user interactions with the user interface. Examples of the components that may be employed within the user interface include buttons, switches, light-emitting diodes, touch screens, displays, stored audio signals, voice recognition, or an application on a computer-enabled device in communication with the processing system 500. Data received at the various interfaces may be provided to the processor 502, as illustrated in FIG. 5. Communication coupling (e.g., shown interconnection mechanism 510) between the processor 502, memory 506, data storage 504, and interface(s) 508 may be implemented as one or more physical busses in conformance with standard, proprietary, or specialized computing bus technologies.

The processor 502 performs a series of routines (e.g., digital signal processing instructions) that result in manipulated data that is stored in and retrieved from the data storage 504, as discussed above. In various examples, the series of instructions result in interpretation of the outputs from the optical resonator, as discussed above. Such instructions may correspond to commands for interpreting peaks and troughs of such output signals to determine phase, amplitude, and/or frequency changes, and recovering information therefrom.

The processor 502 may be any type of processor, multi-processor or controller. For instance, the processor may include a processor manufactured by INTEL, AMD, MOTOROLA, or FREESCALE. In some examples, the processor 502 may be configured to execute an operating system, such as a real-time operating system (RTOS), for instance RTLinux, or a non-real time operating system, such as BSD or GNU/Linux. The operating system may provide platform services to application software. These platform services may include inter-process and network communication, file system management and standard database manipulation. One or more of many operating systems may be used, and examples are not limited to any particular operating system or operating system characteristic.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Examples of specific implementations are provided herein for illustrative purposes only and are not intended to be limiting. Accordingly, the foregoing description and drawings are by way of example only, and the scope of the invention should be determined from proper construction of the appended claims, and their equivalents.

What is claimed is:
1. An optical receiver comprising:
an inlet aperture configured to receive an incident optical signal having an arbitrary polarization; and
a plurality of optical components configured to:
separate the incident optical signal into:
an amplitude modulated transmitted linearly s-polarized signal,
an amplitude modulated transmitted linearly p-polarized signal,
an amplitude modulated reflected linearly s-polarized signal, and
an amplitude modulated reflected linearly p-polarized signal;
combine the amplitude modulated transmitted linearly s-polarized signal and amplitude modulated trans- mitted linearly p-polarized signal into an amplitude modulated transmitted linearly polarized combined signal;

combine the amplitude modulated reflected linearly s-polarized signal and amplitude modulated reflected linearly p-polarized signal into an amplitude modulated reflected linearly polarized combined signal; and provide the amplitude modulated transmitted linearly polarized combined signal and the amplitude modulated reflected linearly polarized combined signal, the plurality of optical components including:

a first optical resonator positioned to receive a first portion of the incident optical signal and convert the first portion of the incident optical signal into a first amplitude modulated polarized signal; and a second optical resonator positioned to receive a second portion of the incident optical signal and convert the second portion of the incident optical signal into a second amplitude modulated polarized signal.

2. The optical receiver of claim 1, wherein the plurality of optical components further includes:

a polarizing beam splitter that receives a portion of the incident optical signal and separates the portion of the incident optical signal into a first linear p-polarized signal and a first linear s-polarized signal, a polarization rotator positioned to receive the first linear s-polarized signal and transform the linear s-polarized signal into a first polarization rotated signal, and a second polarization rotator positioned to receive the first linear p-polarized signal and transform the linear p-polarized signal into a second polarization rotated signal.

3. The optical receiver of claim 2, wherein at least one of the polarization rotator or the secondary polarization rotator is a Faraday rotator.

4. The optical receiver of claim 2, wherein one of:

the first linear s-polarized signal is complex modulated and the polarization rotator is a quarter-wave plate configured to convert the first complex modulated linear s-polarized signal into a complex modulated circularly polarized signal as the first polarization rotated signal, or the first modulated linear p-polarized signal is complex modulated and the second polarization rotator is a quarter-wave plate configured to convert the first complex modulated linear p-polarized signal into a complex modulated circularly polarized signal as the second polarization rotated signal.

5. The optical receiver of claim 2, wherein:

the first optical resonator is positioned to receive the first polarization rotated signal from the polarization rotator and converts a first portion of the first polarization rotated signal to a first portion of the first amplitude modulated polarized signal, that reflects the first portion of the first amplitude modulated polarized signal back to the polarization rotator, that receives a second portion of the first polarization rotated signal from the polarization rotator and converts the second portion of the first polarization rotated signal into a second portion of the first amplitude modulated polarized signal, and that transmits the second portion of the first amplitude modulated polarized signal; and the second optical resonator is positioned to receive the second polarization rotated signal from the second polarization rotator, that converts a first portion of the second polarization rotated signal to a first portion of the second amplitude modulated polarized signal, that reflects the first portion of the second amplitude modulated polarized signal back to the second polarization rotator, that receives a second portion of the second polarization rotated signal from the second polarization rotator and converts the second portion of the second polarization rotated signal into a second portion of the second amplitude modulated polarized signal, and that transmits the second portion of the second amplitude modulated polarized signal.

6. The optical receiver of claim 5, wherein at least one of the first optical resonator or the second optical resonator is an etalon.

7. The optical receiver of claim 5, wherein the polarization rotator receives the first portion of the first amplitude modulated polarized signal reflected from the first optical resonator and is configured to transform the first portion of the first amplitude modulated polarized signal reflected from the first optical resonator into the amplitude modulated reflected linear p-polarized signal and to direct the amplitude modulated reflected linear p-polarized signal back toward the polarizing beam splitter.

8. The optical receiver of claim 7, wherein the second polarization rotator is positioned to receive the first portion of the second amplitude modulated polarized signal reflected from the second optical resonator and configured to transform the first portion of the second amplitude modulated polarized signal reflected from the second optical resonator into the amplitude modulated reflected linear s-polarized signal and to direct the amplitude modulated reflected linear s-polarized signal back toward the polarizing beam splitter.

9. The optical receiver of claim 8, wherein the polarizing beam splitter is configured to combine the amplitude modulated reflected linearly s-polarized signal and amplitude modulated reflected linearly p-polarized signal into the amplitude modulated reflected linearly polarized combined signal and to direct the amplitude modulated reflected linearly polarized combined signal to a first optical output of the optical receiver.

10. The optical receiver of claim 9, wherein the amplitude modulated reflected linearly polarized combined signal is focused into a multimode fiber so that the signal can be processed remotely from the optical receiver.

11. The optical receiver of claim 8, wherein the optical components for the reflected amplitude modulated linearly s-polarized signal and amplitude modulated reflected linearly p-polarized signal are pathlength matched.

12. The optical receiver of claim 5, further comprising a third polarization rotator positioned to receive the second portion of the second amplitude modulated polarized signal transmitted from the second optical resonator and configured to transform the second portion of the second amplitude modulated polarized signal transmitted from the second optical resonator into the amplitude modulated transmitted linearly s-polarized signal.

13. The optical receiver of claim 12, further comprising a fourth polarization rotator positioned to receive the second portion of the first amplitude modulated polarized signal transmitted from the first optical resonator and configured to transform the second portion of the first amplitude modulated polarized signal transmitted from the first optical resonator into the amplitude modulated transmitted linearly p-polarized signal.

14. The optical receiver of claim 13, further comprising a second beam splitter positioned to receive the amplitude modulated transmitted linearly s-polarized signal and the amplitude modulated transmitted linearly p-polarized signal and configured to combine the amplitude modulated transmitted linearly s-polarized signal and amplitude modulated transmitted linearly p-polarized signal into the amplitude modulated transmitted linearly polarized combined signal and to provide the amplitude modulated transmitted linearly polarized combined signal to a second optical output of the optical receiver.

15. The optical receiver of claim 14, wherein the amplitude modulated transmitted linearly polarized combined signal is focused into a multimode mode fiber so that the signal can be processed remotely from the optical receiver.

16. The optical receiver of claim 14, wherein the optical components that provide the amplitude modulated transmitted linearly s-polarized signal and the amplitude modulated transmitted linearly p-polarized signal are pathlength matched.

17. The optical receiver of claim 16, wherein all of the optical components that provide the amplitude modulated transmitted linearly polarized combined signal and the amplitude modulated reflected linearly polarized combined signal are phase matched.

18. A method of processing an incident optical signal having an arbitrary polarization, the method comprising:
    separating the incident optical signal into:
      an amplitude modulated transmitted linearly s-polarized signal,
      an amplitude modulated transmitted linearly p-polarized signal,
      an amplitude modulated reflected linearly s-polarized signal, and
      an amplitude modulated reflected linearly p-polarized signal,
    separating the incident optical signal including:
    directing a first portion of the incident optical signal to a first optical resonator configured to convert the first portion of the incident optical signal into a first amplitude modulated polarized signal; and
    directing a second portion of the incident optical signal to a second optical resonator configured to convert the second portion of the incident optical signal into a second amplitude modulated polarized signal;
    combining the amplitude modulated transmitted linearly s-polarized signal and amplitude modulated transmitted linearly p-polarized signal into an amplitude modulated transmitted linearly polarized combined signal;
    combining the amplitude modulated reflected linearly s-polarized signal and amplitude modulated reflected linearly p-polarized signal into an amplitude modulated reflected linearly polarized combined signal; and outputting the amplitude modulated transmitted linearly polarized combined signal and the amplitude modulated reflected linearly polarized combined signal.

19. The method of claim 18, further comprising directing the amplitude modulated transmitted linearly polarized combined signal into a first optical fiber and directing the amplitude modulated reflected linearly polarized combined signal into a second optical fiber.

20. The method of claim 18, wherein separating the incident optical signal further includes:
    directing the incident optical signal through a polarizing beam splitter that separates the incident optical signal into a first linear p-polarized signal and a first linear s-polarized signal;
    directing the first linear s-polarized signal through a polarization rotator that transforms the linear s-polarized signal into a first polarization rotated signal; and
    directing the first linear p-polarized signal through a second polarization rotator that transforms the linear p-polarized signal into a second polarization rotated signal.

* * * * *